Oct. 7, 1958    R. D. DRAYSON    2,854,948
SLEEPING BAG FOR PETS
Filed Dec. 26, 1956

INVENTOR

Ronald D. Drayson

United States Patent Office 2,854,948
Patented Oct. 7, 1958

2,854,948

SLEEPING BAG FOR PETS

Ronald D. Drayson, Arlington, Calif.

Application December 26, 1956, Serial No. 630,580

1 Claim. (Cl. 119—1)

This invention relates to beds for dogs and other pets.

It is an object of the present invention to provide a sleeping bag for pets which will permit the pet to help himself to more or less cover and warmth as he desires.

It is another object of the present invention to provide a sleeping bag for pets of the above type which can be folded and reduced to a compact unit convenient for storage and portability.

Other objects of the invention are to provide a sleeping bag for pets bearing the above objects in mind which is of simple construction, has a minimum number of parts, is inexpensive to manufacture and efficient in use.

For other objects and for a better understanding of the invention, reference may be had to the following detailed description taken in connection with the accompanying drawing, in which.

Figure 1:
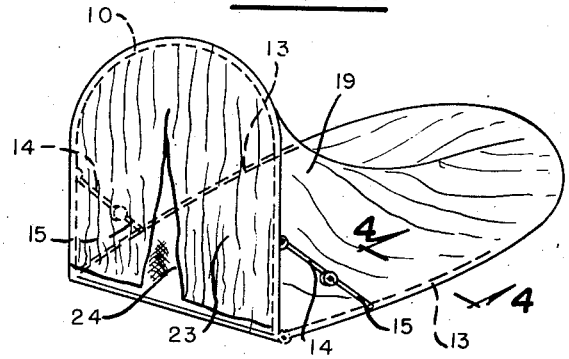
Figure 1 is a perspective view of a preferred embodiment of the present invention.
Figure 2:
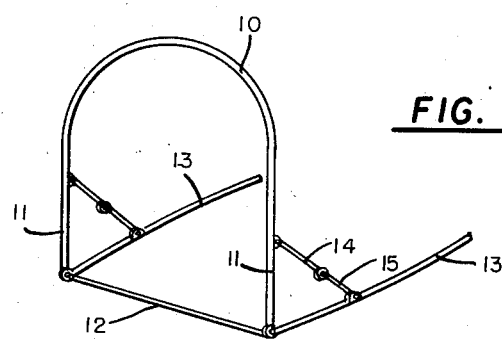
Fig. 2 is a perspective view shown alone of the frame forming a part of the invention.
Figure 3:
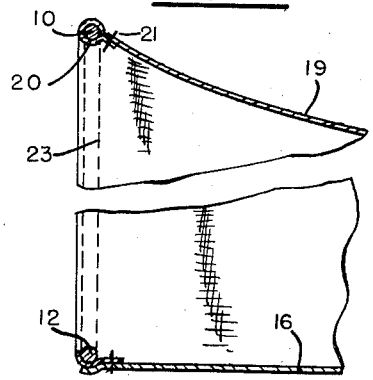
Fig. 3 is an enlarged fragmentary vertical sectional view of the front portion of the device.

Referring now more in detail to the drawing, a rigid frame is provided for the entrance of the device and includes a semicircular top portion 10 integrally formed at the end thereof with the vertical supporting rods 11, the rods 11 at their lower ends being connected by the transverse bottom rod 12, substantially as illustrated.

A pair of rearwardly extending rods 13 are pivotally connected at their forward ends to the ends of the bottom rod 12. The frame 10, 11, 12 is retained at right angles to the rearwardly extending rods 13 by means of the collapsible links 14 pivotally connected at their upper ends to the straight portions 11 and at their lower ends to the second links 15, the links at their lower ends being pivotally connected to the rearwardly extending rods 13.

A pad 16 of kapok or similar material forms the floor of the bed and is provided along the opposite longitudinal edges thereof with the tunnels 17 (Fig. 4) secured by the stitching 18 which receives rearwardly therewithin the rods 13.

Figure 4:
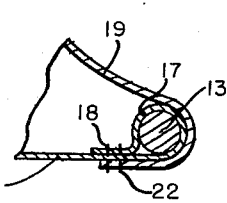
Fig. 4 is an enlarged fragmentary vertical sectional view taken along the line 4—4 of Fig. 1.

A covering of light, warm washable material 19 is secured at its forward open end to the archway 10, 11 by means of the tunnel 20 secured by the stitching 21, the sides of the covering 19 being secured to the undersurface of the bottom 16 around the rods 13 by means of the stitching 22 (Fig. 4). It will be noted that the covering 19 is sufficiently full so as to drape downwardly onto the floor 16 and to come in contact with the animal's body when he crawls to the rear of the bed.

A curtain 23 is suspended in the archway 10, 11 and is provided with the V-shaped opening 24.

In operation, the pet noses his way into the bed and under the cover 19 to his desired position. He can crawl fully into the bed and be completely covered by the overhanging cover 19 or he can take a position which is partially within and partially without, or he can sleep exposed on the cover, the fullness of the cover making this possible. By collapsing the braces 14, 15, the archway 10, 11 can be dropped down against the rods 13 and the floor and covering can be folded over the same, thus making it convenient and a compact bundle for transportation or storage. The curtain 23 may be optional.

While various changes may be made in the detail construction, it shall be understood that such changes shall be within the spirit and scope of the present invention as defined by the appended claim.

What I claim as new and desire to protect by Letters Patent of the United States is:

A sleeping bag for pets comprising, in combination, a substantially rectangular rigid frame having a semi-circular upper end and an opposite lower end, a pair of rearwardly extending rods pivotally connected to said lower end of said frame, collapsible brace means connecting said frame to said rearwardly extending rods maintaining said frame at right angles to said rods selectively supporting said frame for rotation between an erect and a collapsed position, a fabric covering secured to said frame draping downwardly and rearwardly over said rearwardly extending rods, a fabric sheet suspended from said frame defining an entrance curtain therefor, said curtain at the central portion defining an upwardly extending V-shaped cutout providing an access opening for admitting the pet to the interior thereof, said collapsible brace means including a first pair of links pivotally connected at one upper end to the sides of said frame, a second pair of links pivotally connected at one lower end to said rearwardly extending rods, and the opposite ends of said first and second pairs of links being pivotally connected together.

References Cited in the file of this patent

UNITED STATES PATENTS

| | | |
|---|---|---|
| 1,366,405 | MacGowan | Jan. 25, 1921 |
| 1,879,473 | Pitts | Sept. 27, 1932 |
| 1,887,108 | Steese | Nov. 8, 1932 |
| 1,914,160 | Pine | June 13, 1933 |
| 2,032,248 | Bins | Feb. 25, 1936 |
| 2,775,222 | Kruck | Dec. 25, 1956 |